United States Patent
Ohsumi

(10) Patent No.: US 6,663,254 B2
(45) Date of Patent: Dec. 16, 2003

(54) LIGHT GUIDE PLATE, SURFACE LIGHT SOURCE DEVICE AND DISPLAY

(75) Inventor: Kazumasa Ohsumi, Hatogaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/819,722

(22) Filed: Mar. 29, 2001

(65) Prior Publication Data

US 2002/0021563 A1 Feb. 21, 2002

(30) Foreign Application Priority Data

Mar. 30, 2000 (JP) ........................................ 2000-093451

(51) Int. Cl.[7] ................................................. F21V 7/04
(52) U.S. Cl. ........................... 362/31; 362/27; 362/331; 362/555; 362/29; 385/901
(58) Field of Search ............................... 362/31, 27, 29, 362/555, 331; 385/901; 349/63, 65

(56) References Cited

U.S. PATENT DOCUMENTS

| | | | | |
|---|---|---|---|---|
| 5,485,291 A | * | 1/1996 | Qiao et al. ..................... | 359/49 |
| 6,196,691 B1 | * | 3/2001 | Ochiai .......................... | 362/31 |
| 6,305,813 B1 | * | 10/2001 | Lekson et al. ................. | 362/31 |
| 6,347,874 B1 | * | 2/2002 | Boyd et al. .................... | 362/31 |

* cited by examiner

Primary Examiner—Sandra O'Shea
Assistant Examiner—Ali Alavi
(74) Attorney, Agent, or Firm—Staas & Halsey LLP

(57) ABSTRACT

A liquid crystal display panel of a display is illuminated by a surface light source device. The surface light source device comprises a primary light source consisting of, for example, a point-like light source and a light guide plate which is supplied with light to be introduced through an incidence face and to be emitted through an emission face. A back face is provided with repeatedly configured slopes having inclinations such that a backward inner propagation light is converted into an inner reflection light directed to the emission face in order to urge the backward inner propagation light to be emitted preferentially through the emission face. A forward inner propagation light travelling toward a distal end face from an incidence face is rather restrained from being emitted. The backward inner propagation light, which is produced by a reflection at the distal end face, is inner-reflected at the repeatedly configured slopes on the way of approaching the incidence face, resulting in an effective producing of light which is directed to the emission face.

9 Claims, 11 Drawing Sheets

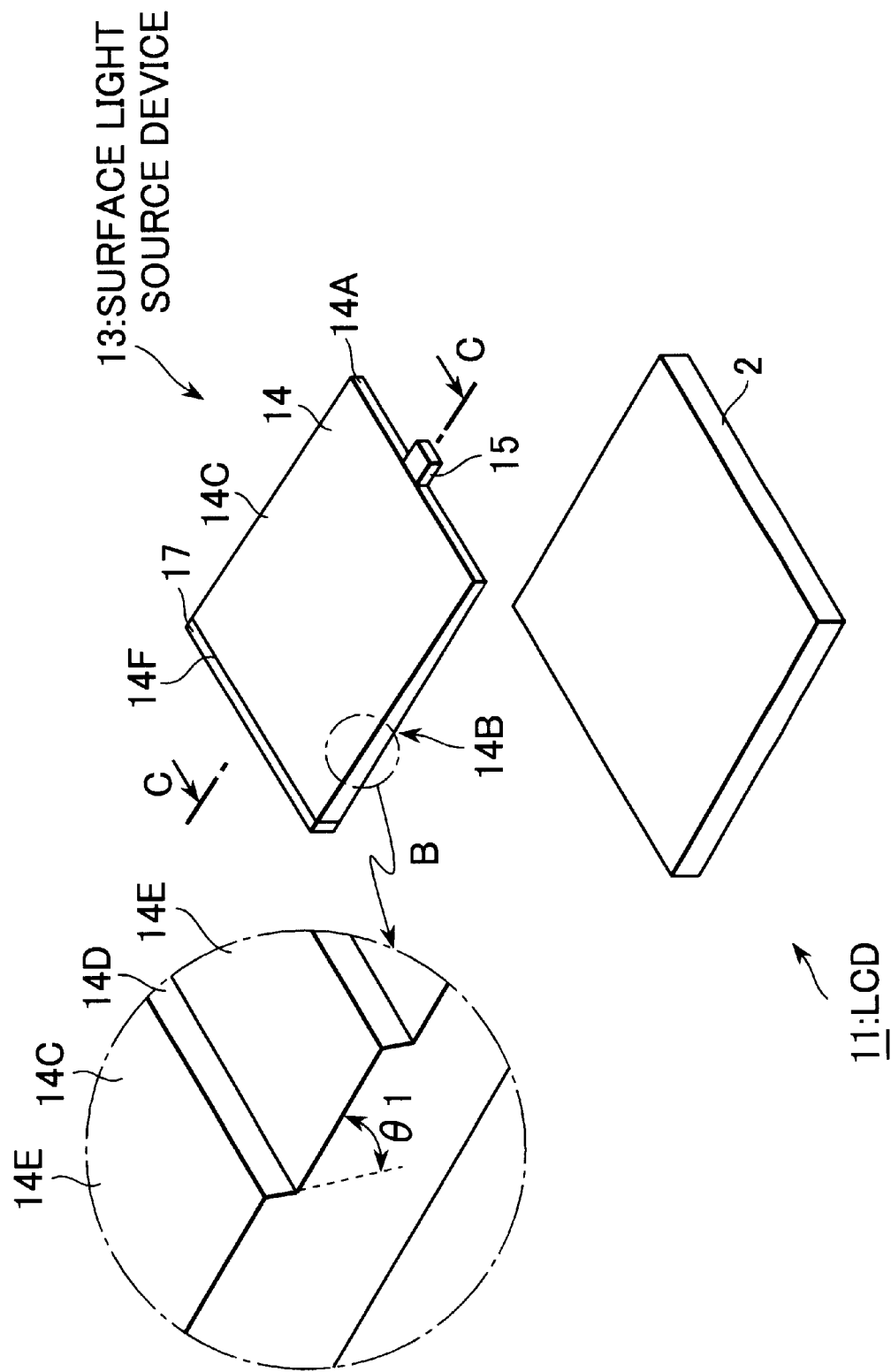

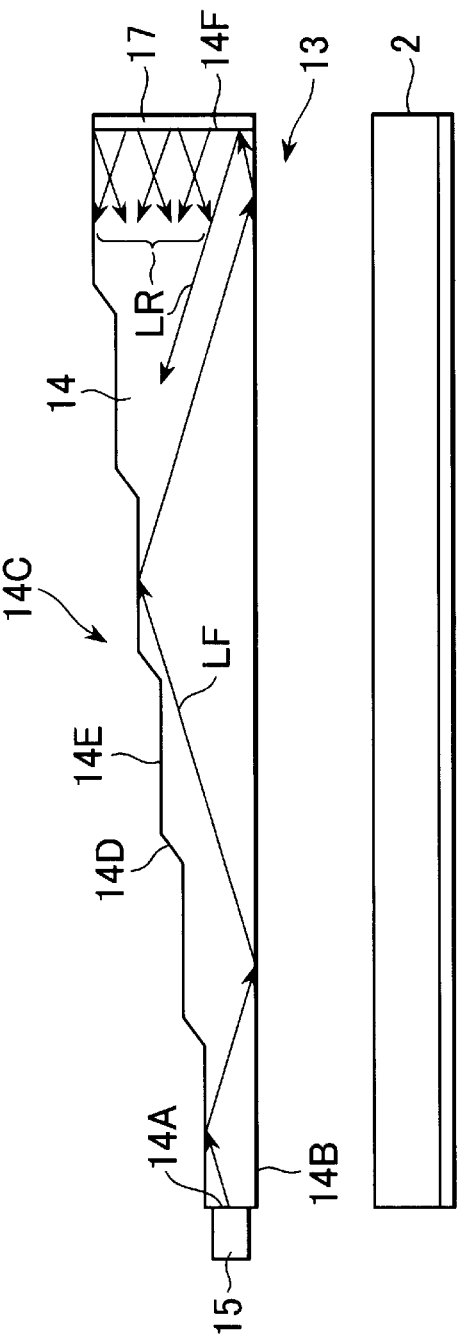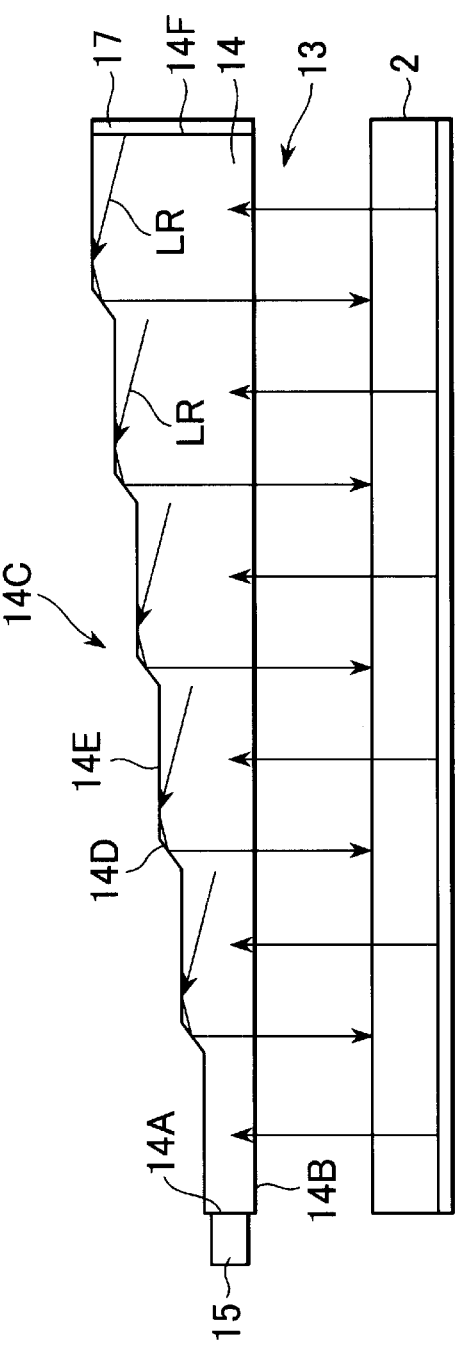

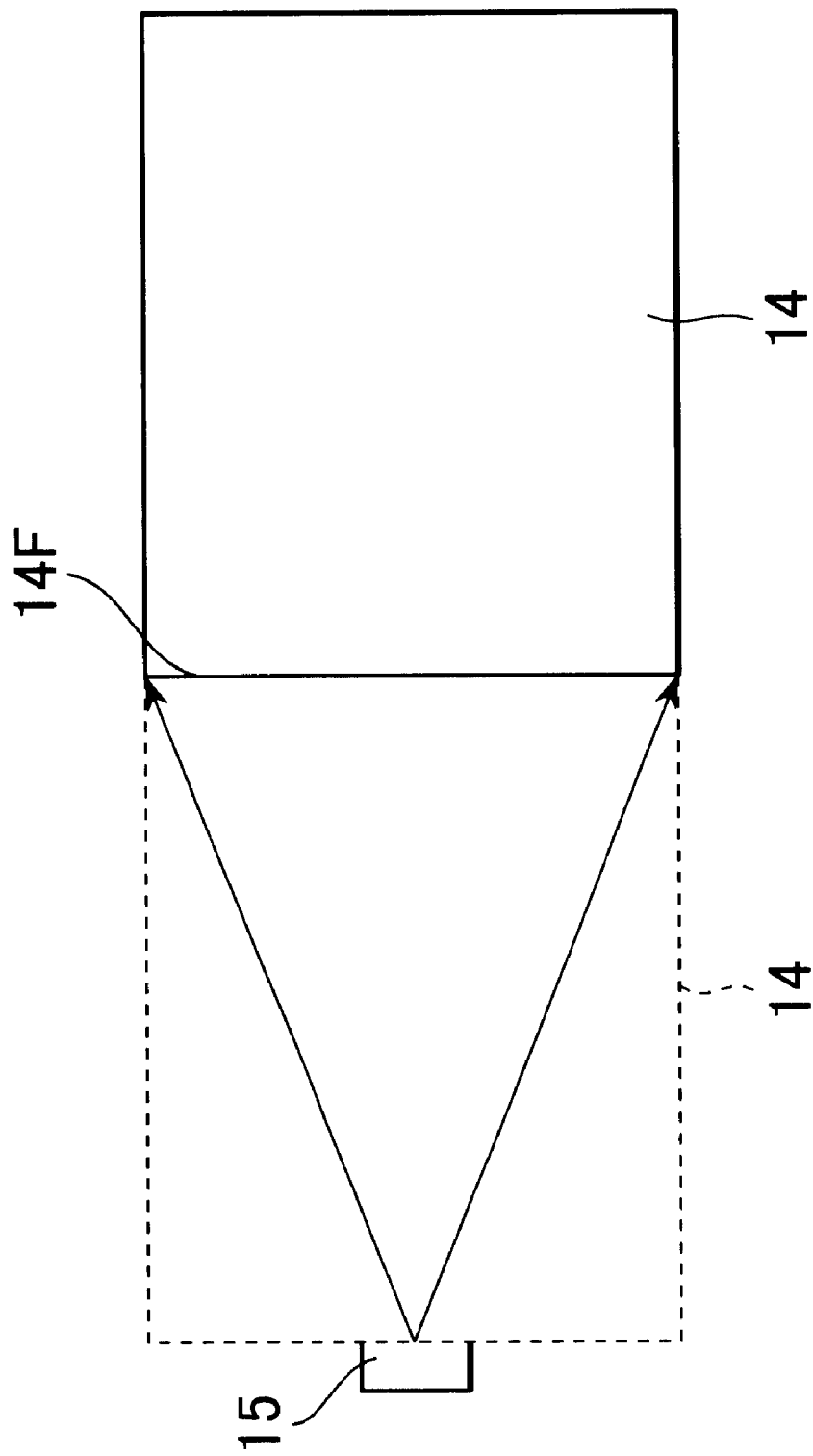

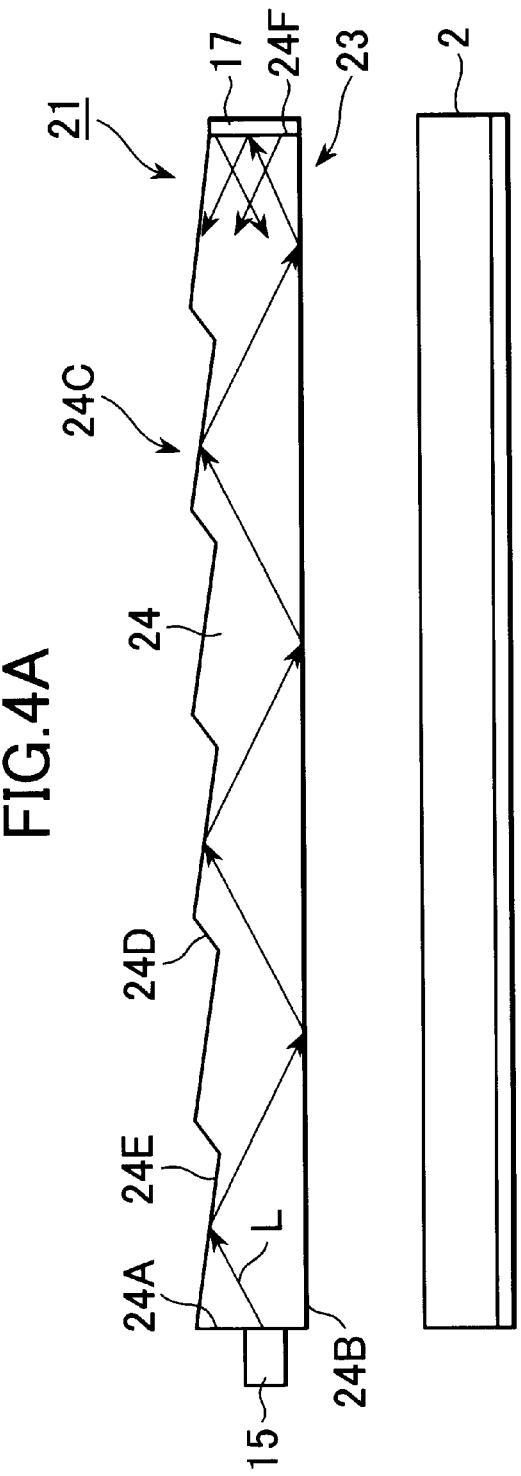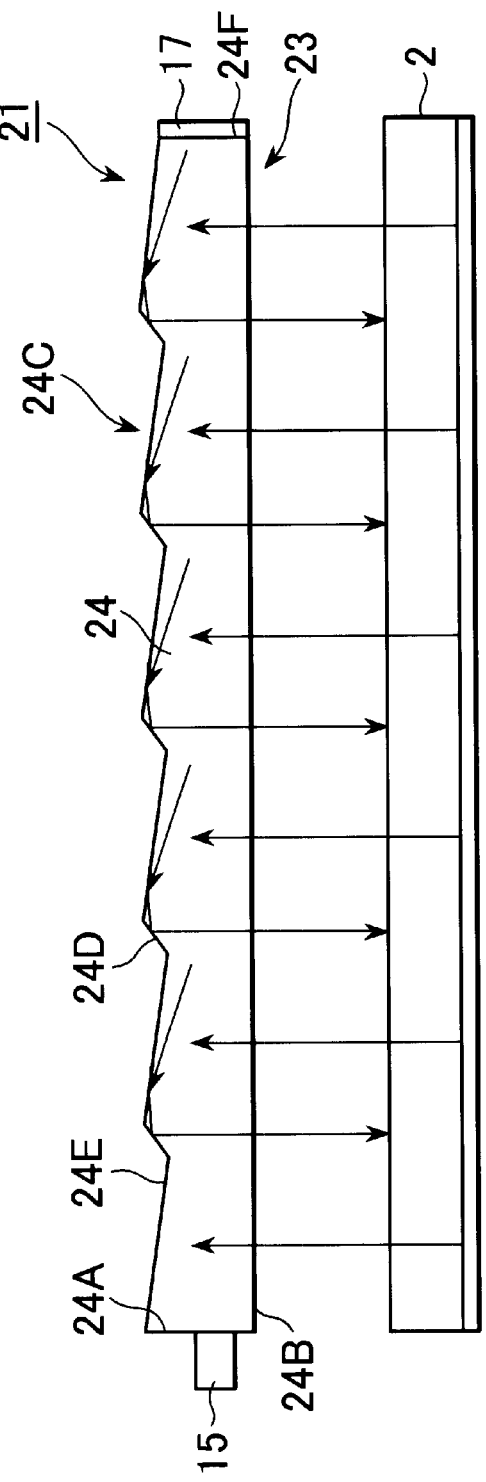

EMISSION PROMOTION SURFACE

INNER RELAY SURFACE

EMISSION PROMOTION SURFACE

LIGHT GUIDE PLATE, SURFACE LIGHT SOURCE DEVICE AND DISPLAY

BACKGROUND

1. Field of Invention

The present invention relates to a light guide plate, surface light source device and display. The present invention is applied, for instance, to a display which is incorporated in a portable phone, personal computer, navigation system, in particular, LCD of frontlighting type or backlighting type.

2. Related Art

It is known well to employ a surface light source device to illuminate a LCD panel of a LCD. In general, a surface light source device comprises a light guide plate and a primary light source for supplying light thereto.

While rod-like fluorescent lamps (cold cathode tubes) are currently and broadly in use as primary light sources, those provided with point-like light emitter(s) such as Light Emitting Diode (called LED hereafter) are employed growingly in recent years. In particular, the latter type becomes rather predominant in the uses for LCDs with generally small-size screen such as LCDs for portable phones.

In a such surface light source device, light is introduced into a light guide plate and followed by an inner propagation on the way of which light is emitted from an emission face gradually. That is, the propagation involves chances of inner incidence to the emission face, with the result that some of light overcoming the critical angle condition escapes from the light guide plate through the emission face.

A surface light source device is incorporated, for example, in a backlighting arrangement or frontlighting arrangement of a LCD to illuminates a LCD panel. An outlined cross section view of a prior art LCD with a frontlighting arrangement is illustrated in FIG. 16. The LCD 1 shown in FIG. 1 is composed of a reflection-type LCD panel 2 and a surface light source device 3 disposed in front of the LCD panel.

While the surface light source device 3 keeps lighting-on, the LCD panel 2 is supplied with light from the surface light source device 3. Beside this, ambient light transmits through the surface light source device 3 to be supplied to the LCD panel 3. Therefore, if the LCD is used in a well-lighted circumstance, the surface light source device 3 is able to provide an image display without lighting-on.

The light incident to the LCD panel 2 contributes the display operation according to a well-known principle. Since the LCD panel 2 belongs to a reflection-type, a reflection light to provide an image display travels from the LCD panel 2, after transmitting through the surface light source device 3 to the ambiance.

The surface light source device 3 comprises a light guide plate 4 made of a transparent plate-like member having a uniform thickness and a primary light source 5 disposed close to a side face of the light guide plate. The primary light source 5 may be a rod-like fluorescent lamp or point-like light emitter(s) such as LED(s). Illumination light L supplied by the primary light source 5 is introduced into the light guide plate 4 through an end face 4A (called "incidence face", hereafter) to become an inner propagation light.

Illumination light L, after becoming an inner propagation light undergoes reflections repeatedly at a major face 4B on the LCD panel 2 side (called "emission face", hereafter) and at a back face 4C opposite with the emission face 4B while propagating as to be distant gradually from the incidence face 4A. Such light propagating within the light guide plate 4 as to be distant gradually from the incidence face 4A, in other words, as to approach a distal end face 4F is called "forward inner propagation light" in the instant specification.

As shown in a partially enlarged illustration A, slopes 4D are formed repeatedly on the back face 4C as to extend approximately in parallel with the incidence face 4A. The slopes 4D have inclinations determined so that a forward propagation light L is converted into an inner reflection light which is directed to a direction roughly frontal with respect to the emission face 4B.

Between slopes 4D, 4D neighbouring each other, inner propagation relay faces 4E connecting the slopes each other are formed in order to avoid thickness of the light guide plate 4 from falling toward the distal end face 4F. As illustrated, the inner propagation relay faces 4E are flat faces gently inclined inversely as compared with the slopes 4D, reflecting an inner propagation light as to give a further advance. Inclination angle of the inner propagation relay faces 4E is, for example, about 4 degrees.

It is noted that "inclination angle" is expressed here as inclination angle with respect to the emission face. Such a small inclination of the inner propagation relay faces 4E leads to almost no light leaking from them.

On the other hand, a forward inner propagation light L inner-impinges to the slopes 4D directly or after being inner-reflected by any inner propagation relay face 4E. In order to produce an inner reflection light directed to the emission face 4B effectively, it is desired that inner reflections at the slopes 4D satisfy the total reflection condition as possible. Taking this standpoint into consideration, each slopes 4D has an inclination angle about 45 degrees. An inner-reflections at a slope 4D brings a roughly frontal emission from the emission face, which is supplied to the LCD panel 2.

However, the above-described prior art tends to bring an uneven brightness on some portion of the emission face 4B. In particular, this problem is strongly apt to arise in cases where the primary light source 5 utilizes a point-like light emitter such as LED. FIG. 17 illustrates an uneven brightness appearing in such a case.

Referring to FIG. 17, a light guide plate 4 employed in a surface light source device, for example, for a LCD incorporated in a portable phone has an incidence face 4A at a center portion of which LED 6 is arranged. The LED emits light which becomes a forward inner propagation light as fore-mentioned and is inner-reflected by slopes formed on a back face (not shown) as to be emitted from an emission face 4B.

Since such an emission promotion is effective for only forward inner propagation light, a shortage of emission occurs in regions where an insufficient forward inner propagation light reaches, in particular, in corner portions ARC indicated by hatching. In other words, the corner portions ARC are dark.

A method of resolving the above-mentioned problem has been proposed. According to the method, a light guide made of a transparent rod-like member is arranged along an incidence face to convert emission from a LED into a line-like illumination light. And this illumination light is introduced into the light guide plate. This method requires a surface light source device to have a complicated structure.

OBJECT AND SUMMARY OF INVENTION

An object of the present invention is to provide a light guide plate which is simply-structured and improved so that an even brightness is realized on an emission face thereof. Another object of the present invention is to provide a surface light source device which is improved so that an even illumination output is obtained. A still another object of the present invention is to provide a liquid crystal display which is improved so that an evenly bright display screen.

Further, viewing from a different standpoint, the present invention aims at a light guide plate improved as to be strikingly suitable for cases where a primary light source utilizing a point-like light emitter is employed, at a surface light source device employing the light guide plate and at a liquid crystal display employing the surface light source device.

In the first place, the present invention is applied to a light guide plate comprising an emission face for outputting light, a back face opposite with said emission face, an incidence face for inputting light and a distal end face located opposite to said incidence face.

According to the present invention, at least one of said back face and said emission face provides an emission promotion surface to urge a backward inner propagation light to be emitted preferentially from said emission face. The term "backward inner propagation light" means light that is produced by a reflection at said distal end and then travels as to approach said incidence face, and this term makes a pair with "forward inner propagation light" which has been defined already.

It is noted that "urge a backward inner propagation light to be emitted preferentially" means "an backward inner propagation light is urged to be emitted more intensively as compared with forward inner propagation light".

In general, backward inner propagation light has undergone a larger distance travelling as compared with a forward inner propagation light. Such a long travelling causes the light to be expanded and spread widely within the light guide plate.

Therefore, an emission promotion effected after a long travelling causes the emission face to provide a uniformalized emission intensity (brightness). After all, a preferential emission promotion of a backward inner propagation light is advantageous for obtaining a uniformalized emission intensity (brightness). It is preferable for reinforcing the backward inner propagation light to dispose a reflector as to be in contact with the distal end of the light guide plate.

According to a typical example of emission promotion surface, said back face is provided with a great number of slopes inclinations of which are determined so that a backward inner propagation light is converted into an inner reflection light which is directed to the emission face, thereby making said back face provide an emission promotion surface. Light input to the light guide plate may be performed by a primary light source consisting of a point-like light emitter.

In the next place, the present invention is applied to surface light source device including a light guide plate and a primary light source, the light guide plate comprising an emission face for outputting light, a back face opposite with said emission face, an incidence face for inputting light and a distal end face located opposite to said incidence face, and said primary source supplying light to said light guide plate through said incidence face.

According to the present invention, at least one of said back face and said emission face provides an emission promotion surface to urge a backward inner propagation light to be emitted preferentially from said emission face. It is noted that the backward inner propagation light is produced by a reflection at said distal end and then travels as to approach said incidence face.

According to a typical example of emission promotion surface, said back face is provided with a great number of slopes inclinations of which are determined so that a backward inner propagation light is converted into an inner reflection light which is directed to the emission face, thereby making said back face provide an emission promotion surface. Light input to the light guide plate may be performed by a primary light source consisting of a point-like light emitter.

Further, the present invention is also applied to liquid crystal display equipped with a surface light source device for illuminating a LCD panel. The surface light source device includes a light guide plate and a primary light source, the light guide plate comprising an emission face for outputting light, a back face opposite with said emission face, an incidence face for inputting light and a distal end face located opposite to said incidence face, and said primary source supplying light to said light guide plate through said incidence face.

According to the present invention, at least one of said back face and said emission face provides an emission promotion surface to urge a backward inner propagation light to be emitted preferentially from said emission face. It is noted that the backward inner propagation light is produced by a reflection at said distal end and then travels as to approach said incidence face.

BRIEF DESCRIPTION OF DRAWINGS

FIG. 1 is a perspective view illustrating a LCD of a first embodiment in accordance with the present invention;

FIG. 2A is a cross section view of a surface light source device along line C—C as shown in FIG. 1, wherein paths of forward inner propagation light are illustrated;

FIG. 2B is a cross section view of a surface light source device along line C—C as shown in FIG. 1, wherein paths of forward inner propagation light are illustrated; to illustrate paths of backward inner propagation light;

FIG. 3 is a plan view to illustrate how the surface light source device shown in FIG. 1 operates;

FIG. 4A is a cross section view to illustrate paths of forward inner propagation light in a second embodiment;

FIG. 4B is a cross section view to illustrate paths of backward inner propagation light in a second embodiment;

EMBODIMENT

Figure 5:
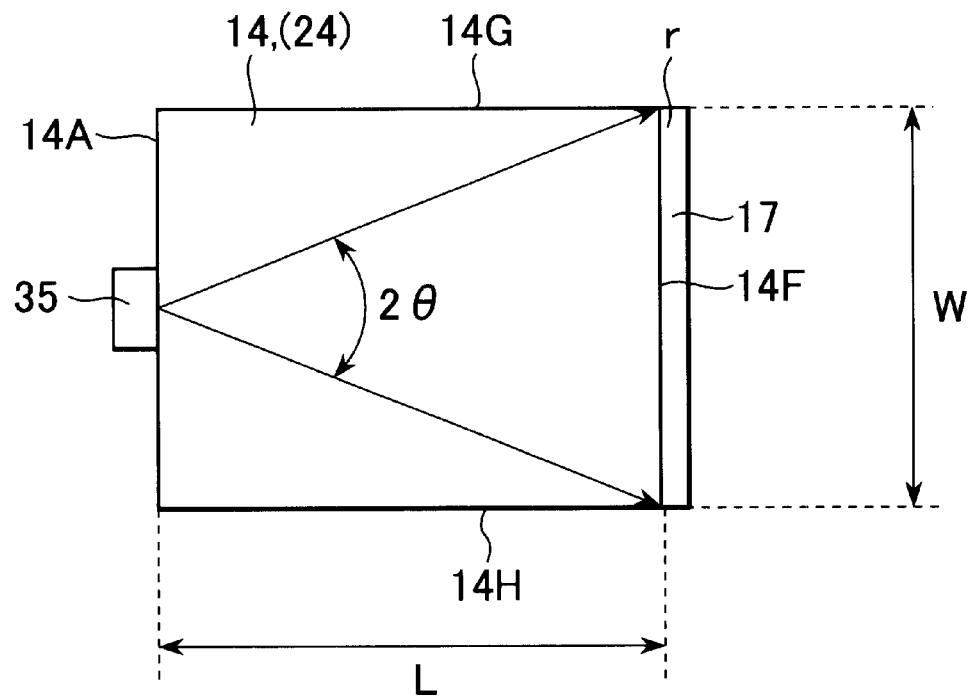
FIG. 5 is a plan view to illustrate a surface light source device which is applied to a LCD of a third embodiment in accordance with the present invention.

Embodiments in accordance with the present invention are described hereafter with reference to the attached drawings. It is noted that factors such as sizes or shapes of elements are exaggerated as required for the sake of easy understanding. And it is also noted that elements common in drawings are referenced by common numerals, respectively, and repeated explanations are omitted reasonably.

First Embodiment

In the first place, referring to FIG. 1, illustrated is an outlined structure of a display (liquid crystal display; LCD) 1 of the first embodiment in accordance with the present invention. The liquid crystal display 1, applied for instance to a portable phone, comprises a reflection-type liquid crystal display panel 2 and a surface light source device 13 for illumination the panel 2.

The surface light source device 13 comprises a light guide plate 14 and LED (point-like light emitter) 15. The light guide plate 14 is a transparent member made of, for example, acrylic resin (PMMA resin) or cycloolefin resin. A major face directed to the LCD panel 2 provides an emission face 14B and the other major face provides a back face 14C.

The thickness tends to increase from a side end face 14A to the other side end face 14B. However, as described later, the thickness has local and repeated variations corresponding to the repeated slopes on the back face 14C.

The LED 15 is a primary light source, being disposed close to a roughly center position of a thicker side end face 14A. The side end face 14A is called "incidence face" and the other side end face 14F is called "distal end face".

Referring to FIG. 2A, the LED 15 emits light which becomes an inner propagation light after being introduced into the light guide plate 14 through the incidence face 14A. This inner propagation light first gets distant increasingly from the incidence face 14A, propagating as to approach the distal end face 14F. This is an "forward inner propagation light".

Forward inner propagation light FL arrives soon at the distal end face 14F, being reflected by the distal end face 14F and a surface of a reflector 17. It is noted that such reflection is put into a simplified expression such as "reflected at the distal end 14F" hereafter.

As illustrated in FIG. 2A, the foresaid reflection produces an backward inner propagation light LR which gets distant increasingly from the distal end face 14F and propagates as to approach the incidence face 14A. The reflector 17 is arranged as to just contact with the distal end face 14F in order to produce an increased and reinforced backward inner propagation light LR.

The reflector 17 is a regular reflection member such as silver tape or an irregular reflection member such as white sheet, being contacted and fixed to the distal end face 14F, for example, by means of adhesion. Alternatively, the reflector 17 may be provided by white ink or the like which is applied to the end face 14F. Further alternatively,, the reflector 17 may be provided by a white frame which put in contact with the end face 14F of the light guide plate 14.

Needless to say, both forward inner propagation light LF and backward inner propagation light LR are inner-reflected by the emission face 14B and back face 14C repeatedly on the way of propagation. Some light is inner-reflected side end faces forming bridges connecting the incidence face 14A with the distal end face 14F. And, as known well, some of components having inner-incident angles smaller than the critical angle escapes out of the light guide plate 14.

It should be noted that the above-mentioned escaping through the emission face 14B is controlled as to cause backward inner propagation light LR to escape preferentially. In other words, forward inner propagation light LF is relatively restrained from escaping through the emission face 14B. However, this does not means that no forward inner propagation light LF is allowed to escape.

For example, the emission face 14B may be roughened slightly to be provided with an "emission promoting function". Such a roughened emission face 14B shows an emission promoting effective to both forward inner propagation light LF and backward inner propagation light LR.

In the first embodiment, the back face 14C operates as to cause backward inner propagation light LR to be emitted from the emission face 14B positively. This operation depends on the slopes 14D formed repeatedly on the back face 14C. The slopes 14D are, as shown in an enlarged cross section view B, extend approximately in parallel with the emission face 14A.

An inclination of each slope 14D is determined so that a backward inner propagation light LR is converted into an inner reflection light directed to an approximately frontal direction with respect to the emission face 14B. The forward inner propagation light LF cannot be inner-incident to the slopes 14D, resulting in no emission promotion by the slopes 14D.

A surface 14E extends between each slope 14D with a slope 14D adjacent thereto to connect them to each other. The surface 14E inner-reflects not only a forward inner propagation light LF at a large inner-reflection angle as to cause the inner-reflected forward inner propagation light LF to continue the forward propagation, inner-reflecting but also a backward inner propagation light LR at a large inner-reflection angle as to cause the inner-reflected backward inner propagation light LR to continue the backward propagation. In this sense, the surface 14E is a kind of "inner propagation relay surface".

The inner propagation relay surface 14E is formed of a flat surface extending approximately in parallel with the emission face 14B. In other words, the inner propagation relay surface 14E is inclined at approximately 0 degree. The slopes 14D are inclined with respect to the inner relay surface 14E, which is approximately in parallel with the emission face 14B, at a angle θ about 45 degrees.

It is noted that the optimum value of angle θ varies to an extent depending on factors such as desired emission direction and refractive index of a material forming the light guide plate. Generally saying, optical members have refractive indices around 1.5. Taking account of this and considering that an emission toward an approximately frontal direction is desired in usual cases, angle θ falls practically within a range from 35 to 50 degrees.

Intensity of the emission from the emission face 14B (i.e. brightness) can be uniformalized by promoting emission of the backward inner propagation light preferentially. The reason is explained as follows with reference to FIG. 3.

As illustrated within a dot-lined light guide plate 14 in FIG. 3, the light emitted from the LED 15 and then introduced into the light guide plate 14 forms a forward inner propagation light that propagates toward the distal end face 14F as to diverge gradually.

In other words, the forward inner propagation light fails to have a sufficient expansion in the vicinity of the incidence face. In general, this tendency also exists when a non-point-like light emitter such as slender rod-like fluorescent lamp is used. For example, when a slender rod-like fluorescent lamp is disposed, relatively less light reaches areas in the vicinity of the corners at both side end of the incidence face 14A. In particular, if electrodes face to the corners, an insufficient light quantity is supplied thereto.

Figure 17:
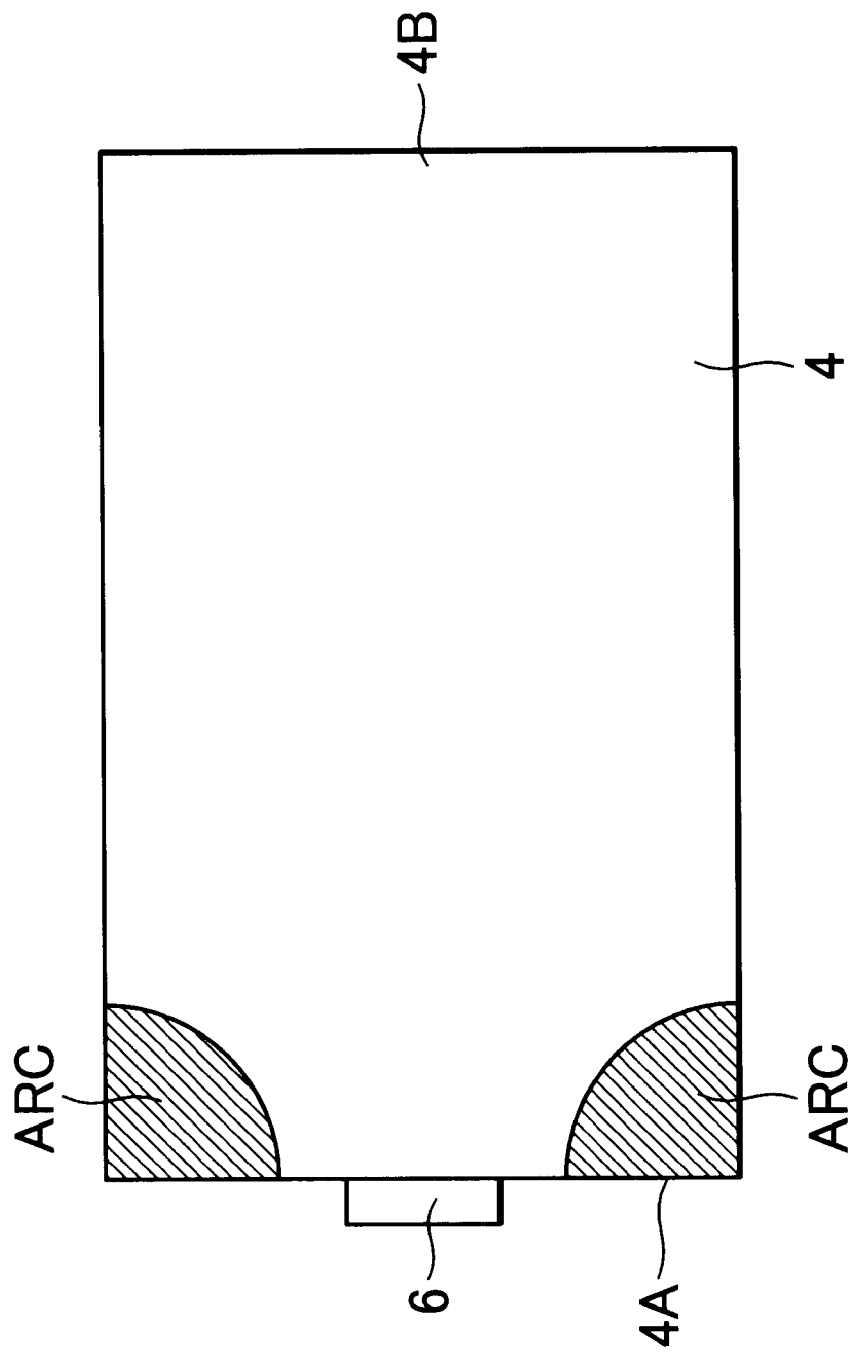
FIG. 17 is a plan view to illustrate problems arising in prior arts.

To the contrary, since the backward inner propagation light is produced through reflections at the distal end face 14F, the backward inner propagation light gets an expansion larger than that of the forward inner propagation light without fail, being expanded enough to reach every portion within the light guide plate 14. Therefore, a preferential emission promotion of the backward inner propagation light will give the emission face 14B a uniformalized brightness, restraining dark area s AR as shown in FIG. 17 from emerging.

The light emitted from the emission face 14B is supplied to the reflection-type LCD panel 2 to contribute to a displaying operation according to a well-known principle. The LCD panel 2 returns a light carrying information to be displayed to the light guide plate 14. This light transmits through the light guide plate 14 along a thickness direction to be outputted from the back face 14C to the ambience. The outputted light enters a viewer's eyes, thereby causing the viewer to recognize the displayed information. The LCD 1 provides a display screen which is free from unevenness in brightness, because the LCD panel 2 is supplied with an even illumination light.

Now described is an example of method of manufacturing the light guide plate 14. The light guide plate 14 may be produced by means of injection molding. A gate through which molten resin is introduced into a mold is preferably arranged at a position which corresponds to a location on the distal end face 17's side. Resin injection from a thicker side renders the resin flow smooth.

Since the gate position is not located on the incidence face 14A side, even if a vestige of the gate remains, an abnormal emission can be made not conspicuous by adopting an irregular-reflection member as the reflector 17. Therefore, unless any problem arises in particular, post-processing for removing the gate vestige may be omitted. This can render the manufacturing processes simplified.

Second Embodiment

Referring to FIGS. 4A and 4B, a LCD 21 of the second embodiment comprises a surface light source device 23 which employs a light guide plate 24, instead of the forementioned light guide plate 14. Except this, there is no difference as compared with the first embodiment. The light guide plate 24 is the same as the light guide plate 24 except that the former has an emission promotion surface which is configurated differently.

The light guide plate 14 has an incidence face 24A, emission face 24B, back face 24C and distal end face 24F, the back face 24C providing an emission promotion surface. This emission promotion surface 24C also has an emission promotion function which is preferentially effective to the backward inner propagation light.

This emission promotion is effected by a great number of slopes 24D formed on the back face 14C. Inner relay face 24E between slopes 24D is an even face which is inclined at a small inclination angle with respect to the emission face 24B while inclined inversely with respect to the slopes 24D so that a thicker side is provided by the incidence face 24A.

This renders the light guide plate 24 generally uniform in thickness except local variations. It is noted that the above-mentioned small inclination angle is not greater than 10 degrees less practically, being about 4 degrees in a typical case. Such a small inclination hardly allows the inner relay face 24E to leak light.

An inclination of each slope 24D is determined so that a backward inner propagation light (See FIG. 4B) is converted into an inner reflection light directed to an approximately frontal direction with respect to the emission face 24B. The forward inner propagation light L (See FIG. 4A) cannot be inner-incident to the slopes 24D, resulting in no emission promotion by the slopes 24D.

The relay surface 24E inner-reflects not only a forward inner propagation light at a large inner-reflection angle as to cause the inner-reflected forward inner propagation light to continue the forward propagation, inner-reflecting but also a backward inner propagation light at a large inner-reflection angle as to cause the inner-reflected backward inner propagation light to continue the backward propagation.

Due to such an emission promotion, the second embodiment also preferentially causes the backward inner propagation light to be emitted toward an approximately frontal direction with respect to the emission face 24B. As previously described, since he backward inner propagation light has a more sufficient expanse as compared with the forward inner propagation light, the emission face 24B shows a uniformalized brightness. Accordingly, the LCD 21 hardly shows an uneven brightness on its display screen.

Third Embodiment

FIG. 5 is a plan view to illustrate a surface light source device which is applied to a LCD of the third embodiment. The third embodiment is featured by an arrangement in which a LED 35 is disposed at a location close to a center of the incidence face 14A, the LED 35 having angular emission characteristics such that a forward inner propagation light diverging as illustrated is produced.

That is, the forward inner propagation light provided by the LED 35 is expanded as to have an expanse equal to width W of the light guide plate 14 at the distal end face 14F. In other words, there is a relation, 2L tan θ=W, among expansion angle 2θ of the forward inner propagation light, width at the distal end face 14F and distance L from the incidence face 14A to the distal end face 14F.

This prevents corner portions around both ends of the distal end face 14F from being supplied with an insufficient quantity of light. The backward inner propagation light produced in the third embodiment spreads, as being aided by reflections by right and left side faces, throughout within the light guide plate 14. The light guide plate 14 is the same as employed in the first embodiment, and accordingly the backward inner propagation light is preferentially converted into an inner reflection light directed to an approximately frontal direction.

As a result, the third embodiment also enables the emission face 14B to show a uniformalized brightness in the third embodiment. Accordingly, the LCD hardly shows an uneven brightness on its display screen.

It will be understood easily without a particular explanation that a similar result can be obtained if the light guide plate 14 is replaced by the light guide plate 24 (bracketed numeral in FIG. 5) employed in the second is embodiment.

Forth Embodiment

Figure 6:
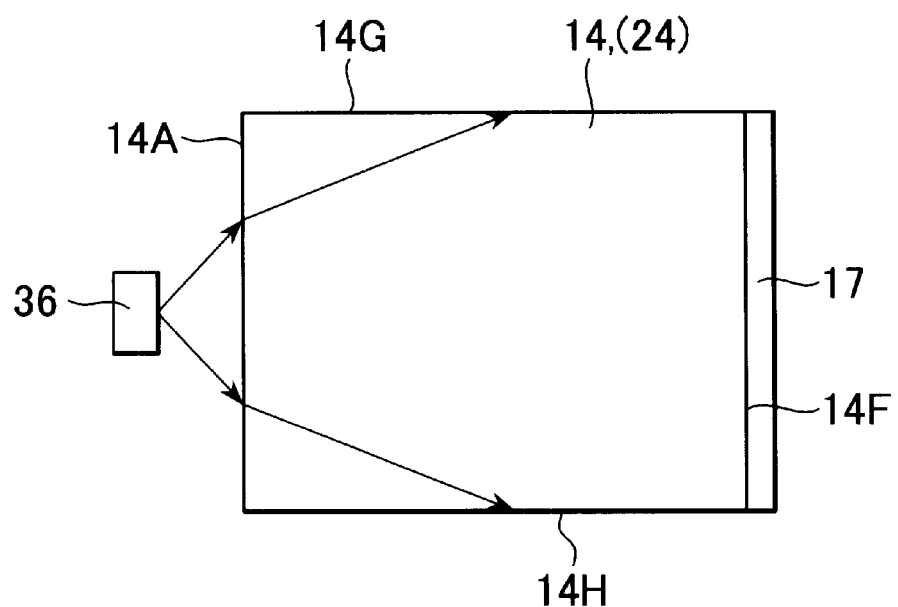
FIG. 6 is a plan view to illustrate a surface light source device which is applied to a LCD of a forth embodiment in accordance with the present invention.

FIG. 6 is a plan view to illustrate a surface light source device which is applied to a LCD of the forth embodiment. The forth embodiment is featured by an arrangement in which a LED 36 is disposed at a location close to a center of the incidence face 14A, the LED 36 having angular emission characteristics such that a forward inner propagation light diverging as illustrated is produced.

That is, the LED 36 emits light which is expanded already to an extent at impinging on the incidence face 14A. After this, a forward inner propagation light is further expanded, as illustrated, as to accords with the width of the light guide plate 14 before reaching the distal end face 14F.

As a result, the fourth embodiment also enables the emission face 14B to show a uniformalized brightness in the third embodiment. Accordingly, the LCD hardly shows an uneven brightness on its display screen.

The light guide plate 14 is the same as employed in the first embodiment, and accordingly the backward inner propagation light is preferentially converted into an inner reflection light directed to an approximately frontal direction.

As a result, the third embodiment also enables the emission face 14B to show a uniformalized brightness in the third embodiment. Accordingly, the LCD hardly shows an uneven brightness on its display screen.

It will be understood easily without a particular explanation that a similar result can be obtained if the light guide plate 14 is replaced by the light guide plate 24 (bracketed numeral in FIG. 6) employed in the second is embodiment.

Fifth Embodiment

Figure 7:
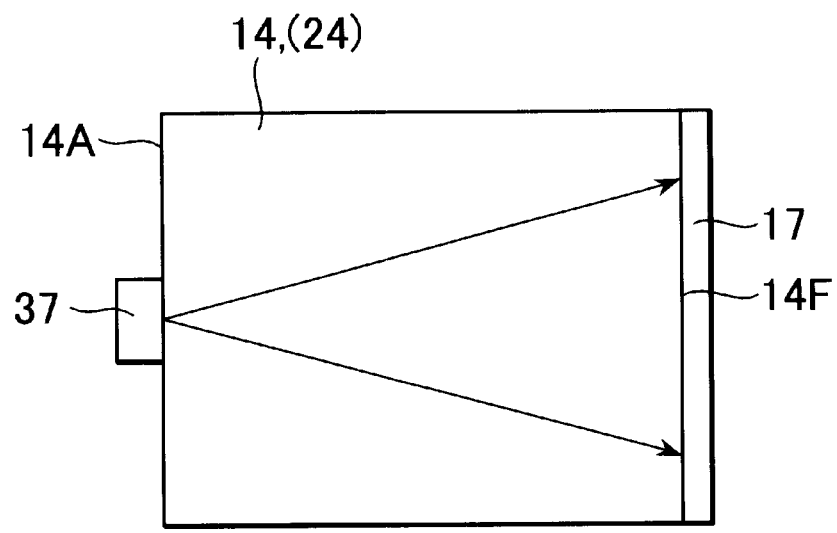
FIG. 7 is a plan view to illustrate a surface light source device which is applied to a LCD of a fifth embodiment in accordance with the present invention.

FIG. 7 is a plan view to illustrate a surface light source device which is applied to a LCD of the fifth embodiment. The fifth embodiment is featured by an arrangement in which a LED 37 is disposed at a location close to a center of the incidence face 14A, the LED 36 having angular emission characteristics such that a forward inner propagation light diverging as illustrated is produced.

That is, the LED 37 emits light which is introduced through the incidence face 14A to provide an forward inner propagation light, which is expanded to a width somewhat smaller than that of the light guide plate 14 at reaching the distal end face 17A. Therefore, somewhat less sufficient light reaches corner portions around both ends of the distal end face 17F as compared with the third or forth embodiment.

Figure 16:
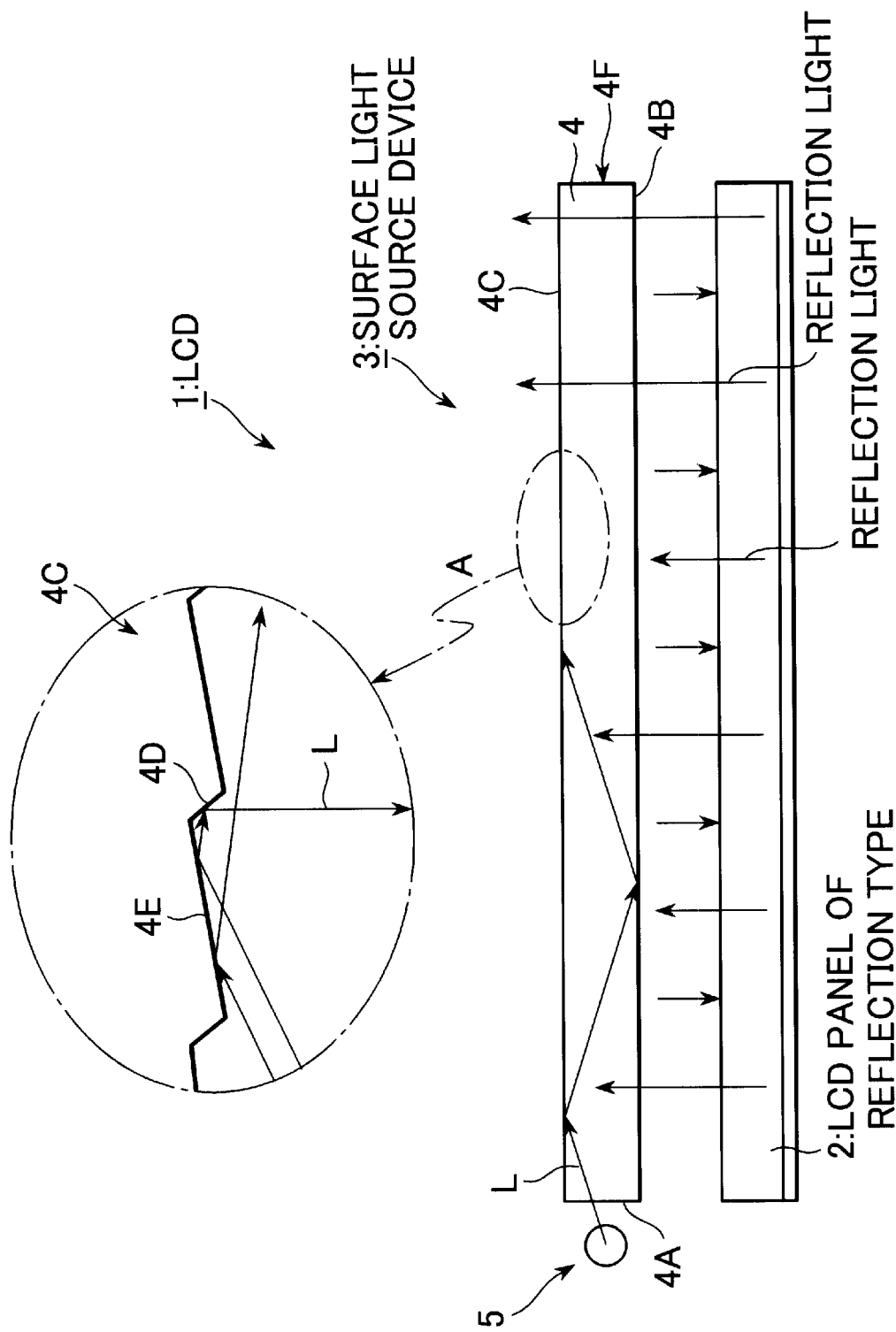
FIG. 16 is a cross section view of a LCD of according to an prior art.

However, since emission of the backward inner propagation light is preferentially promoted as compared with that in the case of the forementioned prior art (FIG. 16) employing the same LED 37, a reduced unevenness in brightness is realized. Accordingly, a point-like light emitter having a sharp emitting directivity as the LED 37 is enabled to employed without difficulty. Provided that the LED 37 is applied to the prior device shown in FIG. 16, dark areas ARC as illustrated in FIG. 17 will emerge strikingly, rendering the device unsuitable for practical use. The fifth embodiment restrain such dark areas from appearing.

It will be understood easily without a particular explanation that a similar result can be obtained if the light guide plate 14 is replaced by the light guide plate 24 (bracketed numeral in FIG. 7) employed in the second is embodiment.

Sixth Embodiment

Figure 8:
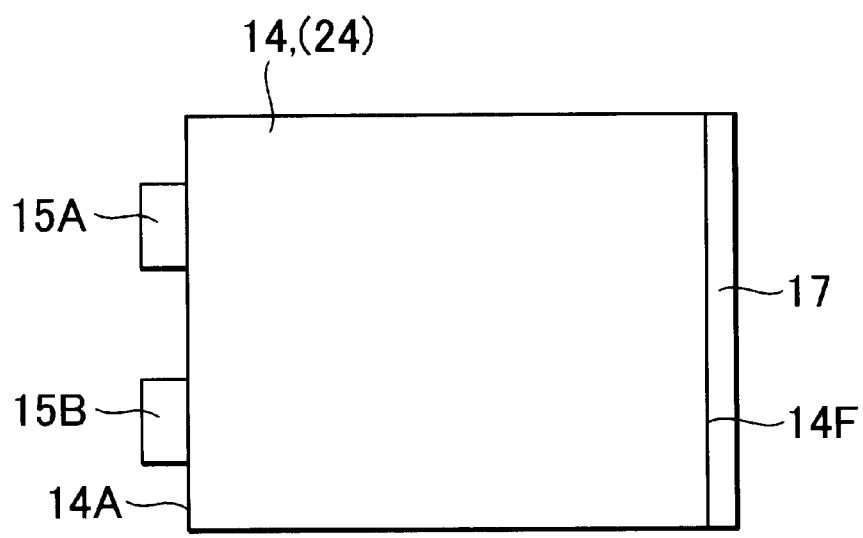
FIG. 8 is a plan view to illustrate a surface light source device which is applied to a LCD of a sixth embodiment in accordance with the present invention.

FIG. 8 is a plan view to illustrate a surface light source device which is applied to a LCD of the sixth embodiment. The sixth embodiment is featured by an arrangement in which a pair of LEDs 15a, 15B are disposed, as illustrated, on the both side of a generally center portion of the incidence face 14A with an interval between them.

Accordingly, a forward inner propagation light is produced by the two LEDs 15A, 15B. The forward inner propagation light produced by the two LEDs 15A, 15B is reflected by the distal end face 14F, becoming a backward inner propagation light.

The sixth embodiment gives the backward inner propagation light diversified paths and also an expanse with ease because light supply is performed from two places. The light guide plate 14 is the same as employed in the first embodiment, and accordingly the backward inner propagation light is preferentially converted into an inner reflection light directed to an approximately frontal direction.

As a result, the sixth embodiment also enables the emission face 14B to show a uniformalized brightness in the third embodiment. Accordingly, the LCD hardly shows an uneven brightness on its display screen.

It will be understood easily without a particular explanation that a similar result can be obtained if the light guide plate 14 is replaced by the light guide plate 24 (bracketed numeral in FIG. 8) employed in the second is embodiment.

It is,noted that LEDs 15A, 15B emitting light with different colors from each other, if employed, enables the LCD to have a display screen with optionally changeable different colors. Besides, if three colors of LEDs emitting light of red (R), green (G) and blue (B) respectively are arranged at the incidence face 14A, in a not shown arrangement, and switching of them is controlled according to open-close control of liquid crystal cells, color display is realized.

Seventh Embodiment

Figure 9:
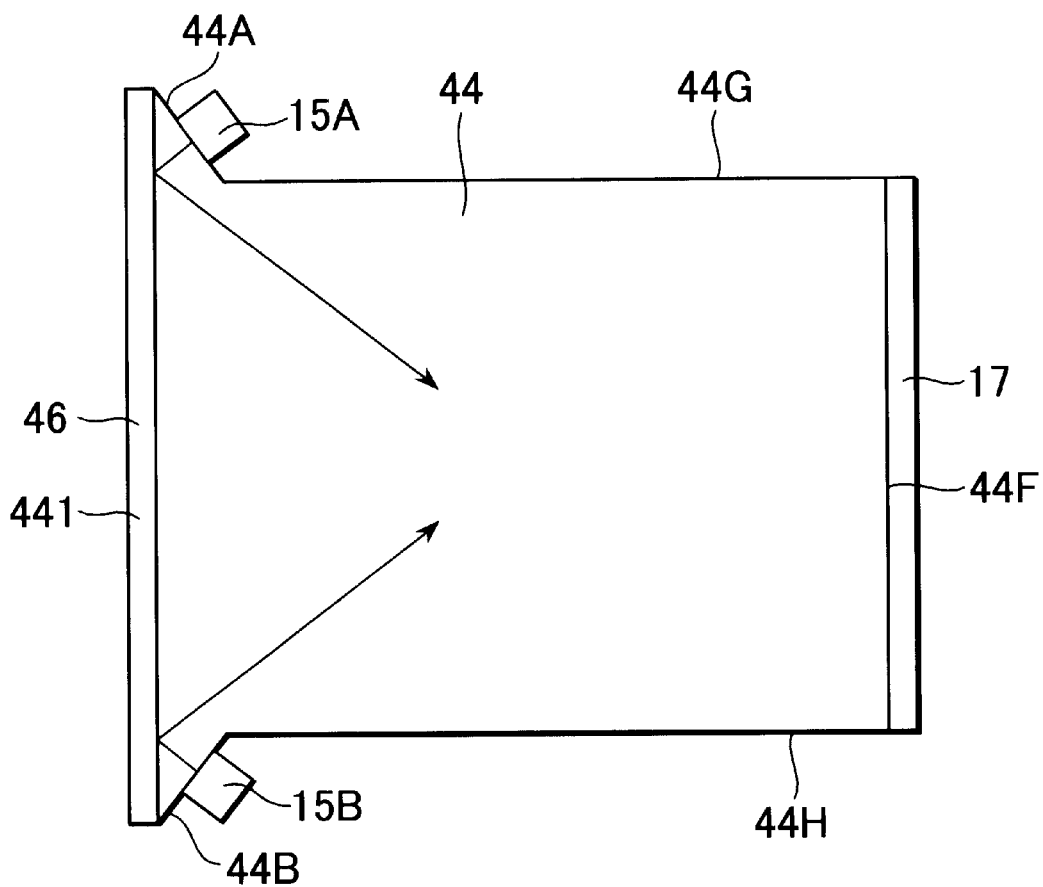
FIG. 9 is a plan view to illustrate a surface light source device which is applied to a LCD of a seventh embodiment in accordance with the present invention.

FIG. 9 is a plan view to illustrate a surface light source device which is applied to a LCD of the seventh embodiment. The seventh embodiment employs a light guide plate 44 having side end faces 44I, 44F on both of which reflectors 17, 46 are disposed. And incidence faces 44A, 44B are formed on the side surfaces of triangular regions near to the incidence face 44I. Side faces 44G, 44H connect the incidence faces 44A, 4B with a distal end 44F, respectively.

A pair of LEDs 15A, 15B are disposed close to one and the other of the incidence faces 44A, 44B, respectively. The LEDs 15A, 15B emits light which is introduced into the light guide plate 44 through the incidence faces 44A and 44B and is, after a very short travelling, reflected by the side end face 44G.

From this, an inner propagation toward the distal end face 44F starts. In the embodiment, this inner propagation toward the distal end face 44F after being reflected by the side end face 44G provides an forward inner propagation light. The forward inner propagation light produced by two LEDs 15A, 15B is reflected by the distal end face 44F to become a backward inner propagation light.

The backward inner propagation light has diversified paths and also an expanse with ease because light supply is performed from two places. The light guide plate 44 has a back face, not shown, which provides an emission promotion surface in the same manner as that of the light guide plate 14 employed in the first embodiment or the light guide plate 24 employed in the second embodiment. Therefore the backward inner propagation light is preferentially converted into an approximately frontal emission.

As a result, the seventh embodiment also brings a uniformalized brightness on an emission face. The LCD hardly shows an uneven brightness on its display screen.

In this embodiment, the LEDs 15A, 15B emitting light with different colors from each other, if employed, also enables the LCD to have a display screen with optionally changeable different colors.

Eighth Embodiment

Figure 10:
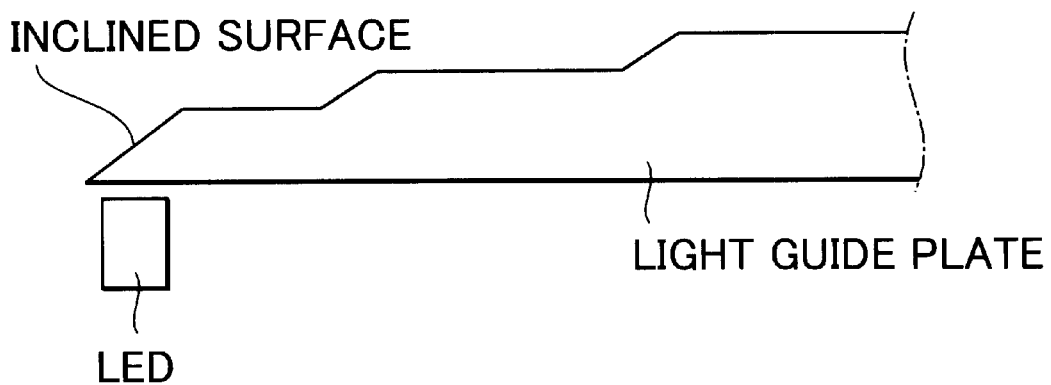
FIG. 10 is a plan view to illustrate a surface light source device which is applied to a LCD of an eighth embodiment in accordance with the present invention.

FIG. 10 is a cross section view to illustrate a portion around an incidence face of a surface light source device which is applied to a LCD of the eighth embodiment. The eighth embodiment employs a light guide plate having an inclined side end face, as illustrated, which produces an forward inner propagation light through an inner-reflection. A LED is disposed in the vicinity of an incidence face (a part of an emission face) located near to a side end face. The LED emits light is introduced into the light guide plate through the incidence face and is, after a very short travelling, inner-reflected by the inclined side end face.

From this, an inner propagation toward a distal end face (not shown) starts. In the embodiment, this provides an forward inner propagation light. The forward inner propagation light is reflected by the distal end face to become a backward inner propagation light. The light guide plate has a back face which provides an emission promotion surface in the same manner as that of the light guide plate 14 employed in the first embodiment or the light guide plate 24 employed in the second embodiment. Therefore the backward inner propagation light is preferentially converted into an approximately frontal emission.

As a result, the eighth embodiment also brings a uniformalized brightness on an emission face. The LCD hardly shows an uneven brightness on its display screen.

Ninth Embodiment

Figure 11:
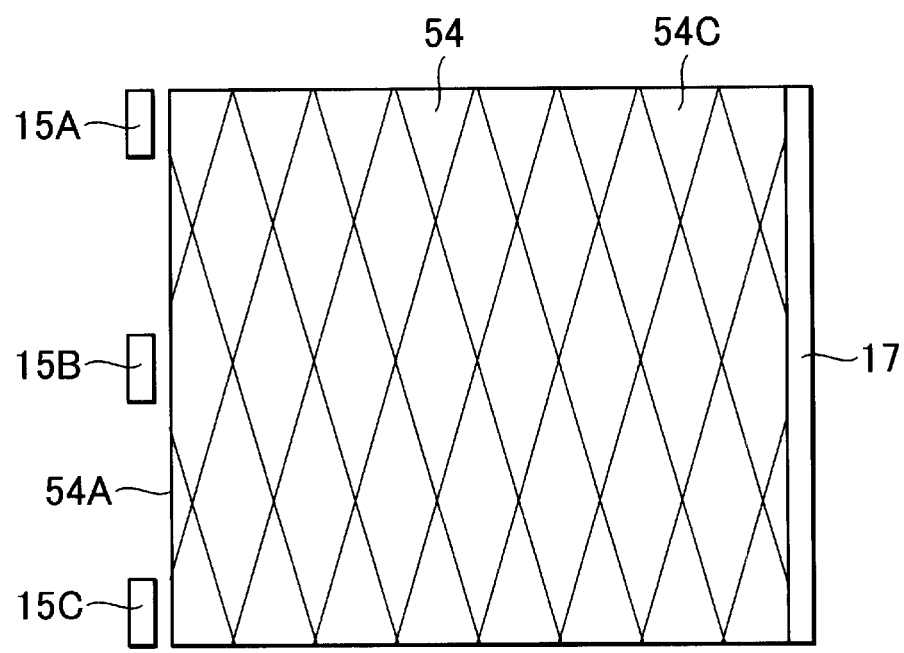
FIG. 11 is a plan view to illustrate a surface light source device which is applied to a LCD of a ninth embodiment in accordance with the present invention.

FIG. 11 is a plan view to illustrate a surface light source device which is applied to a LCD of the ninth embodiment. The ninth embodiment employs a light guide plate 54 having an end face providing an incidence face 54A in the vicinity of both sides and a center portion of which three LEDs 15A, 15B, 15C are disposed.

The light guide plate 54 has a back face 54C on which slopes and inner relay surfaces are formed repeatedly, thereby providing an emission promotion surface. In FIG. 11, these slopes and inner relay surfaces are disposed as to be classified into two groups.

That is, they have two extending directions inclined with respect to the incidence face 54A differently from each other, corresponding to the respective groups, as groups of thin lines show. This arrangement aims to fit the situation that fluxes of backward inner propagation light directed to different oblique directions are produced through reflections of light emitted from the LEDs 15A and 15C at a distal end face or a reflector 17.

Optional one or two, or all of three LEDs 15A, 15B and 15C may be lighted on at the same time. In every case, the backward inner propagation light is preferentially converted into an emission. Color displaying operation by employing three kinds (colors) of LEDs 15A, 15B and 15C cane be realized.

Tenth Embodiment

Figure 12:
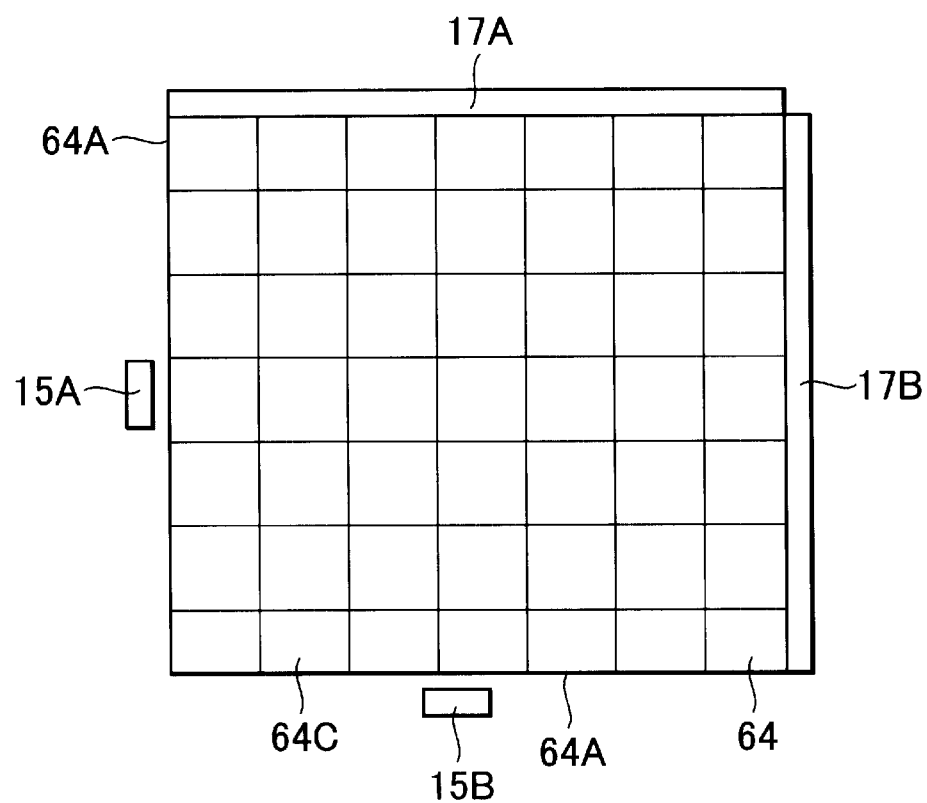
FIG. 12 is a plan view to illustrate a surface light source device which is applied to a LCD of a tenth embodiment in accordance with the present invention.

FIG. 12 is a plan view to illustrate a surface light source device which is applied to a LCD of the tenth embodiment. The tenth embodiment employs a light guide plate 64 having two end faces providing incidence faces 64A, 64A on both sides of a generally center portion of which two LEDs 15A and 15B are disposed.

The light guide plate 64 has a back face 64C on which slopes and inner relay surfaces are formed repeatedly, thereby providing an emission promotion surface. In FIG. 12, these slopes and inner relay surfaces are disposed as to be classified into two groups.

That is, they have two extending directions vertical with respect to the incidence face 64A, corresponding to the respective groups, as groups of thin lines show.

This arrangement aims to fit the situation that fluxes of backward inner propagation light directed to two directions generally vertical to each other are produced through reflections of light emitted from the LEDs 15A and 15C at a distal end face or reflectors 17A, 17B.

Other Modifications

The above-described embodiments do not limit the scope of the present invention at all. For instance, the following modifications are allowed.

(a) In the above-described embodiments, LCDs of so-called frontlighting type are described. However, this puts no limitation on the present invention and the present invention is applicable to LCDs of backlighting type. If a backlighting arrangement is employed, a reflection sheet is preferably disposed along a back face. This returns light, leaked from through the back face, to a light guide plate, thereby avoiding loss of light.

Figure 13:
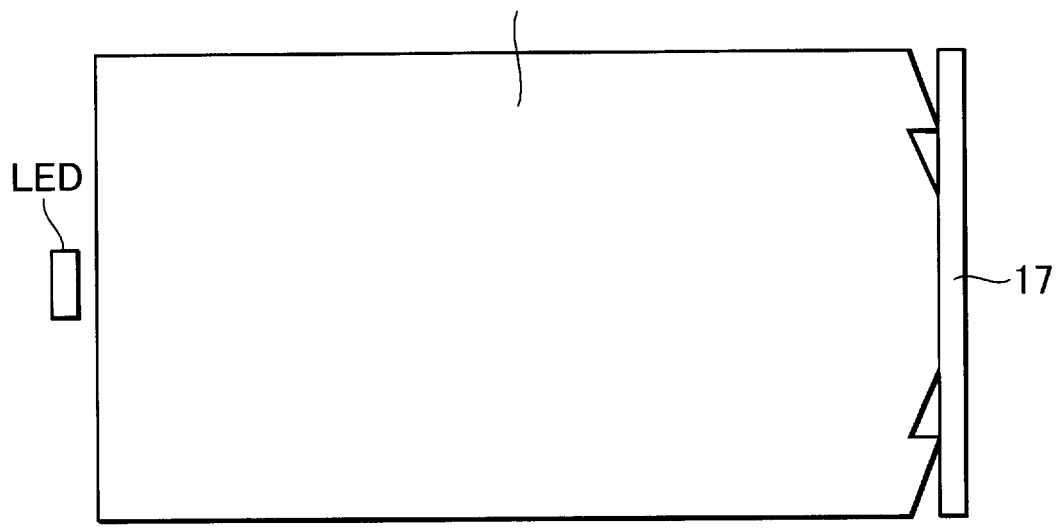
FIG. 13 is a plan view to illustrate a surface light source device which is applied to a modified embodiment in accordance with the present invention.

(b) In the above-described embodiments, flat distal end faces are employed. However, for example, prism cutting may be applied alternatively as shown in FIG. 13. This jagged prism cut is formed, for example, so that a diverging forward inner propagation light is converted into a highly parallel backward inner propagation light at a distal end face.

Figure 14:
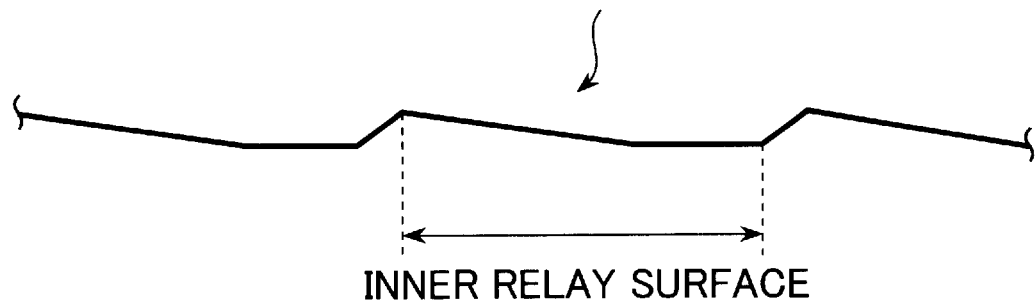
FIG. 14 is a cross section view of a light guide plate in accordance with the present invention, wherein an emission promotion surface according to a modification is illustrated.
Figure 15:
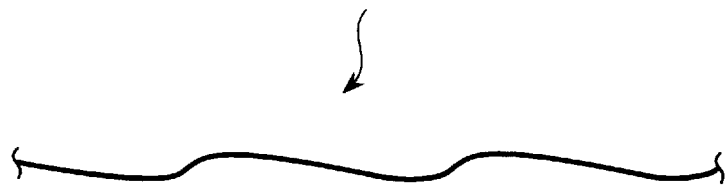
FIG. 15 is a cross section view of a light guide plate in accordance with the present invention, wherein an emission promotion surface according to another modification is illustrated.

(c) In the above-described embodiments, an emission promotion surface is composed of a pair of flat surfaces. Alternatively, as shown in FIG. 14, an inner relay surface may be composed of a pair of surfaces, one extending parallel with an emission face, the other extending inclined with respect to the emission face. Further alternatively, as shown in FIG. 15, an emission promoting surface may be formed of a curved surface as a whole.

(d) The above-described embodiments employ a cross-section-jagged or cross-section-stepwise configuration composed of slopes 14D or 24D and inner relay surface 14E or 24E. However, such configurations do not limit the present invention. That is, any emission promotion surface may be employed so far as it has an emission promotion function which is preferentially effective to a backward inner propagation light.

Further to this, so far as the above requirement is satisfied, the emission promotion function may be also effective to a forward inner propagation light to some degrees. In that case, the emission includes components blended with each other, one originating from the backward inner propagation light, the other originating from the forward inner propagation light, which uniformalizes brightness.

(e) The above-described embodiments employ LEDs as primary light sources. Alternatively, however, a point-like light emitter may be provided by a light emitting end of a light guide such as optical fiber through which an illumination light is guided to an incidence face of a light guide plate.

Further alternatively, a primary light source may be a rod-like light source such as fluorescent lamp which has a length extremely shorter than that between side faces of a light guide plate.

(f) Various known techniques relating to surface light sources may be additionally applied unless the features of the present invention are spoiled.

For example, four or more point-like light emitters may be arranged. A light guide plate made of a known light scattering-and-guiding material may be employed. Light scattering-and-guiding material is, for instance, composed of a transparent resin and transparent fine particles which have a refractive index different from that of the resin and are dispersed in the resin.

Various optical members such as polarization filter may be arranged on an emission face in a surface light source device or liquid crystal display.

What is claimed is:

1. A light guide plate comprising:

an emission face for outputting light;

a back face opposite with said emission face;

an incidence face for inputting light; and a distal end face located opposite to said incidence face, wherein at least one of said back face and said emission face provides an emission promotion surface to urge a backward inner propagation light to be emitted preferentially from said emission face, said backward inner propagation light being produced by a reflection at said distal end and then travelling as to approach said incidence face, said light inputting being performed by a primary light source comprising a point-like light emitter so that an obliquely travelling forward inner propagation light is mainly produced.

2. A light guide plate according to claim 1, wherein a reflector for increasing said backward inner propagation light is arranged in contact with said distal end face.

3. A light guide place according to claim 1, wherein said back face is provided with a great number of slopes which are inclined so that said inner propagation light is converted into an inner reflection light directed to said emission face, thereby providing an emission promoting surface.

4. A surface light source device comprising:

a light guide plate having an emission face for outputting light, a back face opposite with said emission face, an incidence face for inputting light and a distal end face located opposite to said incidence face; and a primary light source to supply light into said light guide plate through said incidence face, wherein at least one of said back face and said emission face provides an emission promotion surface to urge a backward inner propagation light to be emitted preferentially from said emission face, said backward inner propagation light being produced by a reflection at said distal end and then travelling as to approach said incidence face, said primary light source inputting the light to the incidence face and comprising a point-like light emitter so that an obliquely travelling forward inner propagation light is mainly produced.

5. A surface light source device according to claim 4, wherein a reflector for increasing said backward inner propagation light is arranged in contact with said distal end face.

6. A surface light source device according to claim 4, wherein said back face is provided with a great number of slopes which are inclined so that said backward inner propagation light is converted into an inner reflection light directed to said emission face, thereby providing an emission promoting surface.

7. A display including a liquid crystal display panel and a surface light source device for illuminating said liquid crystal display panel, said surface light source device comprising:

a light guide plate having an emission face for outputting light, a back face opposite with said emission face, an incidence face for inputting light and a distal end face located opposite to said incidence face; and a primary light source to supply light into said light guide plate through said incidence face, wherein at least one of said back face and said emission face provides an emission promotion surface to urge a backward inner propagation light to be emitted preferentially from said emission face, said backward inner propagation light being produced by a reflection at said distal end and then travelling as to approach said incidence face, said primary light source inputting the light to the incidence face and comprising a point-like light emitter so that an obliquely travelling forward inner propagation light is mainly produced.

8. A display according to claim 7, wherein a reflector for increasing said backward inner propagation light is arranged in contact with said distal end face.

9. A display according to claim 7, wherein said back face is provided with a greater number of slopes which are inclined so that said backward inner propagation light is converted into an inner reflection light directed to said emission face, thereby providing an emission promoting surface.

* * * * *